US009608858B2

(12) United States Patent
Asati et al.

(10) Patent No.: US 9,608,858 B2
(45) Date of Patent: Mar. 28, 2017

(54) RELIABLE MULTIPATH FORWARDING FOR ENCAPSULATION PROTOCOLS

(71) Applicant: Cisco Technology, Inc., San Jose, CA (US)

(72) Inventors: Rajiv Asati, Morrisville, NC (US); Nagendra K. Nainar, Morrisville, NC (US); Carlos M. Pignataro, Raleigh, NC (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 14/336,839

(22) Filed: Jul. 21, 2014

(65) Prior Publication Data
US 2016/0020941 A1    Jan. 21, 2016

(51) Int. Cl.
*G01R 31/08* (2006.01)
*H04L 12/24* (2006.01)
*H04L 12/707* (2013.01)
*H04L 29/14* (2006.01)
*H04L 12/703* (2013.01)

(52) U.S. Cl.
CPC ......... *H04L 41/0659* (2013.01); *H04L 45/24* (2013.01); *H04L 69/40* (2013.01); *H04L 45/28* (2013.01)

(58) Field of Classification Search
None
See application file for complete search history.

(56) References Cited

U.S. PATENT DOCUMENTS

| 7,948,986 | B1  | 5/2011  | Ghosh et al. |
| 8,111,649 | B1* | 2/2012  | Agarwall ............... H04L 12/00 370/328 |
| 8,284,758 | B2  | 10/2012 | Shah et al. |
| 8,351,329 | B2  | 1/2013  | Pignataro et al. |
| 8,472,346 | B1* | 6/2013  | Bahadur ............. H04L 43/0811 370/254 |

(Continued)

OTHER PUBLICATIONS

Kompella et al., "Detecting Multi-Protocol Label Switched (MPLS) Data Plane Failures", Request for Comments 4379, Feb. 2006, 50 pages, The Internet Society.

(Continued)

*Primary Examiner* — Phirin Sam
(74) *Attorney, Agent, or Firm* — Parker Ibrahim & Berg LLC; James M. Behmke; Stephen D. LeBarron

(57) ABSTRACT

In one embodiment, an ingress router sends a multipath information query across a computer network toward an egress router, and builds an entropy table based on received query responses. The entropy table maps the egress router to one or more available paths to the egress router, and associated entropy information for each respective available path of the one or more available paths. The ingress router may then forward traffic to the egress router using the entropy table to load share the traffic across the one or more available paths using the associated entropy information for each respective available path. In response to detecting a failure of a particular path of the one or more available paths, however, the ingress router then removes the particular path from the entropy table, thereby ceasing forwarding of traffic over the particular path.

21 Claims, 13 Drawing Sheets

(56) References Cited

U.S. PATENT DOCUMENTS

| | | | |
|---|---|---|---|
| 8,543,727 B2* | 9/2013 | Boustead | H04L 12/4633 370/238 |
| 8,755,383 B2 | 6/2014 | Keesara | |
| 9,331,929 B1* | 5/2016 | Thomas | H04L 43/0817 |
| 2006/0168317 A1* | 7/2006 | Charzinski | H04L 45/00 709/238 |
| 2006/0291473 A1* | 12/2006 | Chase et al. | 370/395.5 |
| 2007/0070893 A1* | 3/2007 | Butenweg | H04L 45/12 370/230 |
| 2010/0238795 A1* | 9/2010 | Boutros | H04L 45/00 370/219 |
| 2011/0211579 A1* | 9/2011 | Cao et al. | 370/392 |
| 2013/0223275 A1* | 8/2013 | Vasseur | H04L 45/26 370/254 |
| 2013/0315244 A1* | 11/2013 | Rabie et al. | 370/392 |
| 2013/0336315 A1 | 12/2013 | Guichard et al. | |
| 2014/0146664 A1* | 5/2014 | Amante | H04L 45/50 370/228 |
| 2014/0226514 A1* | 8/2014 | Zhou | H04L 43/0829 370/252 |
| 2015/0180771 A1* | 6/2015 | Ashwood-Smith | H04L 45/72 370/230 |

OTHER PUBLICATIONS

Worster et al., "Encapsulating MPLS in IP or Generic Routing Encapsulation (GRE)", Request for Comments 4023, Mar. 2005, 14 pages, The Internet Society.

* cited by examiner

| REMOTE PE 510 | LIST OF PATHS 520 | ENTROPY TABLE 500<br>ENTROPY INFORMATION 530 |
|---|---|---|
| ePE | PATH 1 - iPE-R2-R3-R6-R9-ePE | EL1 (Ex: 10-50) |
| ePE | PATH 2 - iPE-R2-R3-R7-R9-ePE | EL2 (Ex: 51-100) |
| ePE | PATH 3 - iPE-R2-R4-R5-R9-ePE | EL3 (Ex: 101-200) |
| ... | ... | ... |

FIG. 5

RELIABLE MULTIPATH FORWARDING FOR ENCAPSULATION PROTOCOLS

TECHNICAL FIELD

The present disclosure relates generally to computer networks, and, more particularly, to multipath forwarding for encapsulation protocols.

BACKGROUND

Service providers offering virtual private network (VPN) services (e.g., Layer 3 or Layer 2) over Border Gateway Protocol are expected to have multiple paths (e.g., equal cost multi-path or "ECMP") between ingress provider edge (PE) routers and egress PE routers that are commonly provisioned with VPN services. In such scenarios, any intermediate/transit node with multiple (e.g., ECMP) paths to an egress PE can use some selected information as input for hashing in order to decide the egress interface for packet forwarding. For example, this information can be either L3/L4 details from the packet, Entropy Labels, or 3/5/7-tuple entities.

Notably, however, if one of the multiple paths (e.g., label-switched paths or "LSPs") is broken due to reasons such as hardware programming corruption, label mismatching, encapsulation protocol being broken, etc., then any traffic forwarded on that failed path would get dropped or black-holed, even if all other paths are healthy. This is because the node performing the ECMP action may not be aware of the path failure elsewhere.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example entropy table;

DESCRIPTION OF EXAMPLE EMBODIMENTS

Overview

Figure 1:
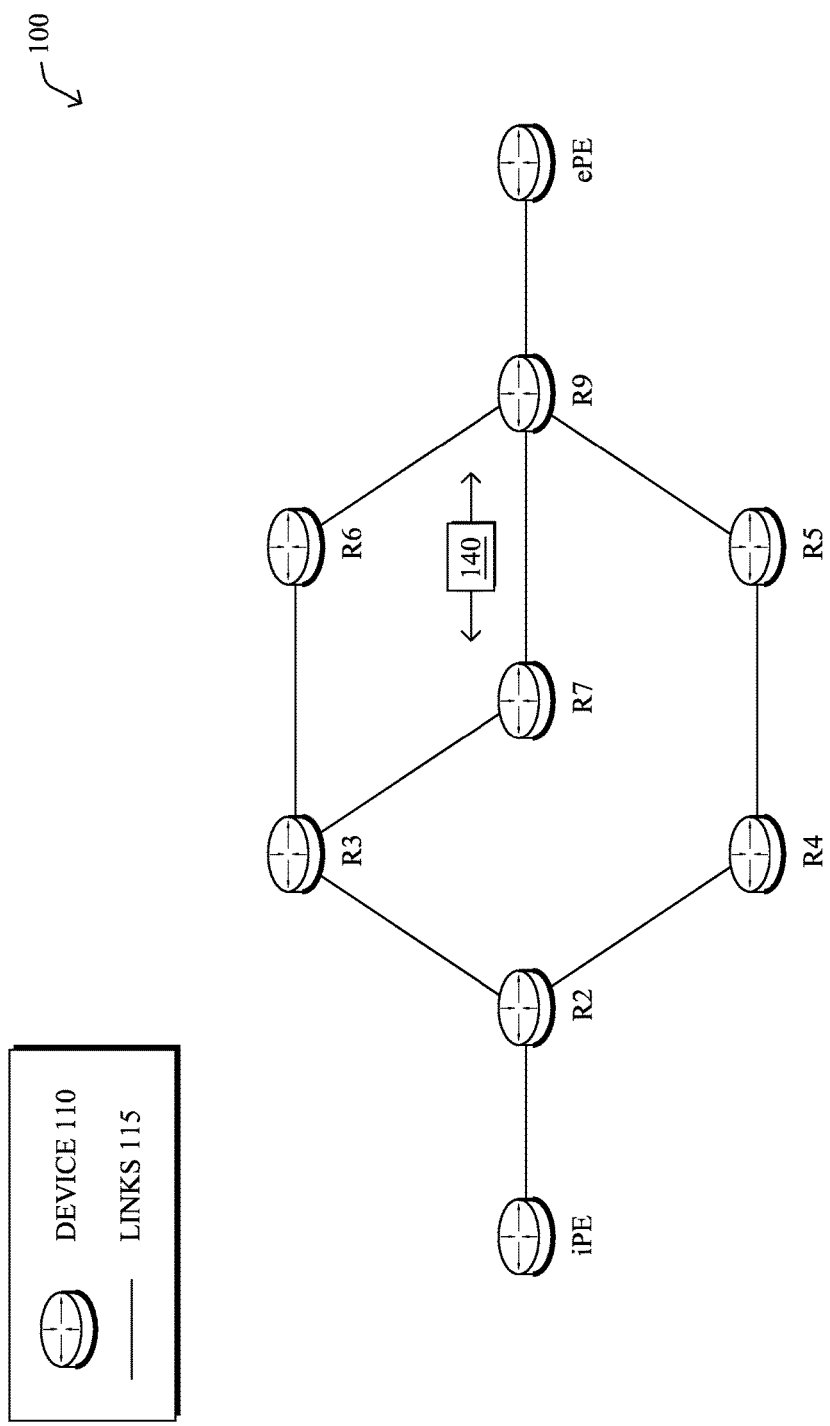
FIG. 1 illustrates an example computer network.

According to one or more embodiments of the disclosure, an ingress router sends a multipath information query across a computer network toward an egress router, and builds an entropy table based on received query responses. The entropy table maps the egress router to one or more available paths to the egress router, and associated entropy information for each respective available path of the one or more available paths. The ingress router may then forward traffic to the egress router using the entropy table to load share the traffic across the one or more available paths using the associated entropy information for each respective available path. In response to detecting a failure of a particular path of the one or more available paths, however, the ingress router then removes the particular path from the entropy table, thereby ceasing forwarding of traffic over the particular path.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example simplified computer network 100 illustratively comprising nodes/devices, such as a plurality of routers/devices 110 interconnected by links 115 or networks, as shown. For example, network 100 may illustrates a service provider network, where provider edge (PE) devices may allow for communication between various customer networks (e.g., with customer edge or "CE" devices) via a core network (e.g., via provider or "P" core devices). As shown, and as described below, from the perspective of one particular direction, one of the PE devices is an ingress PE (iPE) while another is the egress PE (ePE), and the core network of P devices ay consist of routers "R2", "R3", "R4", "R5", "R6", "R7", and "R9", interconnected as shown. Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, across a WAN (e.g., the Internet), etc.

Data packets 140 (e.g., traffic/messages) may be exchanged among the nodes/devices 110 of the computer network 100 over links 115 using predefined network communication protocols such as the Transmission Control Protocol (TCP), User Datagram Protocol (UDP), IPv4/IPv6, Asynchronous Transfer Mode (ATM) protocol, Frame Relay protocol, etc.

Figure 2:
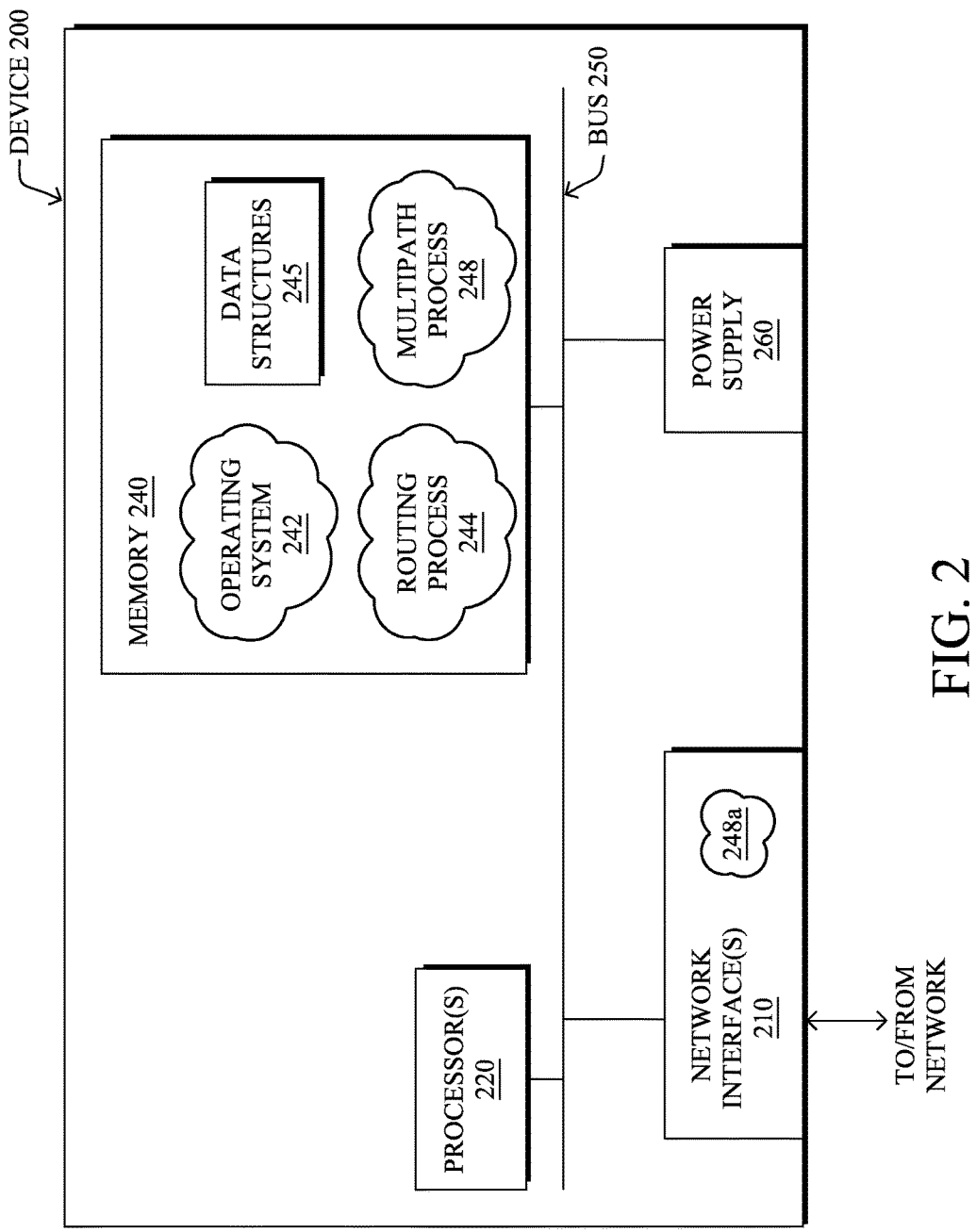
FIG. 2 illustrates an example network device/node.

FIG. 2 is a schematic block diagram of an example device 200 that may be used with one or more embodiments described herein, e.g., such as any of the PE devices or other devices as shown in FIG. 1 above. The device may comprise one or more network interfaces 210, one or more processors 220, and a memory 240 interconnected by a system bus 250. The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244 and an illustrative multipath process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

As noted above, service providers offering VPN services over BGP are expected to have multiple paths (e.g., equal cost multi-path or "ECMP") between ingress PE (iPE) routers and egress PE (ePE) routers that are commonly provisioned with VPN services. In such scenarios, any intermediate/transit node with multiple (e.g., ECMP) paths to an egress PE can use some selected information as input for hashing in order to decide the egress interface for packet forwarding. For example, this information can be either L3/L4 details from the packet, Entropy Labels, or 3/5/7-tuple entities.

Entropy labels, for example, are "random" label values included in a header field (e.g., an IP header or an MPLS label stack) of a packet to facilitate ECMP based load-balancing ("flow entropy"). Without entropy labels in a network where devices (e.g., label-switching routers (LSRs)) are performing ECMP solely on the basis of the header field, packets with the same forwarding information (e.g., header/label stack) will typically all follow the same path since most ECMP implementations use the forwarding information (e.g., header/label stack) as the input to hash-based load-balancing algorithms. When multiple flows have the same forwarding information this means they cannot be effectively load-balanced. Entropy labels solve this problem by giving the source router the ability to "tag" different flows with different entropy label values, resulting in different headers/label stacks for different flows and better ECMP load-balancing.

Notably, however, if one of the multiple paths (e.g., label-switched paths or "LSPs") is broken due to reasons such as hardware programming corruption, label mismatching, encapsulation protocol being broken, etc., then any traffic forwarded on that failed path would get dropped or black-holed, even if all other paths are healthy. This is because the node performing the ECMP action may not be aware of the path failure elsewhere.

Figure 3A:
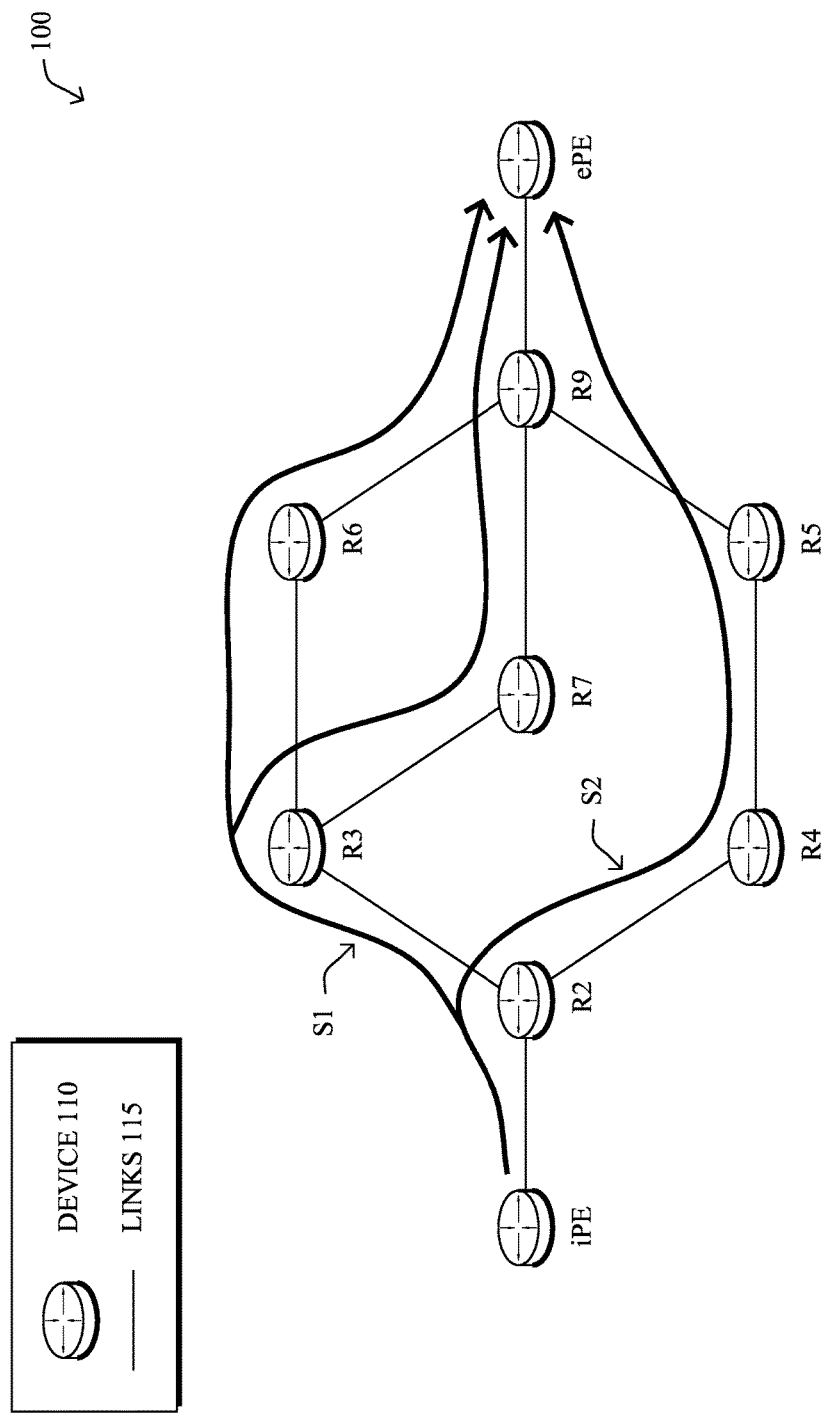
FIGS. 3A-3B illustrate an example of path failure during multipath forwarding.
Figure 3B:
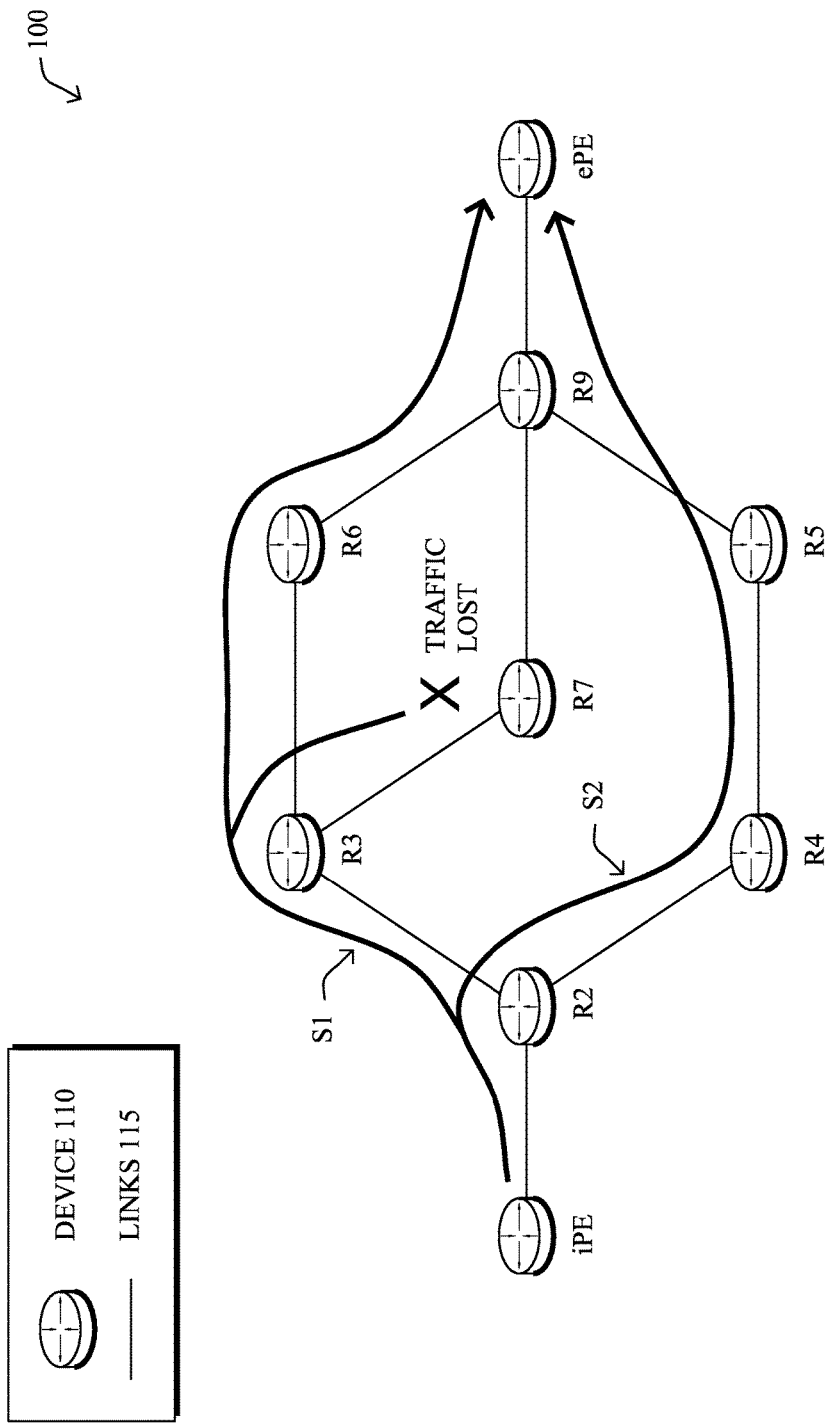

As shown in FIG. 3A (using the example topology shown above in FIG. 1), assume that iPE forwards two traffic streams, S1 and S2, toward ePE. R2 may then decide (e.g., using a locally selected multipath criteria) to send S1 towards R3 and S2 towards R4. If, however, the LSP to ePE is broken on either R6 or R7, particularly R7 as shown in FIG. 3B, there is currently no way to redirect that traffic. The use of connectivity verification protocols such as bi-directional forwarding detection (BFD) from iPE to ePE may help to detect the R2-R3-R?-R9 LSP failure (where R? is either R6 or R7), but that does nothing at iPE or R2 to avoid sending the traffic on that broken path. Furthermore, in the case where no ECMP path is available, and if the connectivity verification protocol fails for label based path (LSP) validation between iPE and ePE, there is currently no way to avoid the complete outage between iPE and ePE for the encapsulation protocol (e.g., an MPLS outage). Unlike for more traditional path failure reasons, such as link flap or physical link failure, manual (e.g., administrator) intervention is often the only recourse when the failure is due to more difficult reasons such as black-holing or programming issues.

Reliable Multipath Forwarding

The techniques herein provide for reliable multipath forwarding for encapsulation protocols. In particular, according to one or more embodiments described herein, each may PE advertise different encapsulation modes supported (e.g., in preferential order) for any VPN prefix. Each iPE may choose the encapsulation method based on preference, and uses a multipath information query to populate a local table with entropy details for each available path to an ePE, and triggers a per-path connectivity verification protocol session (e.g., a BFD session) to the ePE. In case of a detected failure, the iPE either uses different entropy details (i.e., a different path) to make sure the data traffic is not flowing over the faulty path, or else may change the encapsulation mode used.

Illustratively, the techniques described herein may be performed by hardware, software, and/or firmware, such as in accordance with the multipath process 248/248a, which may contain computer executable instructions executed by the processor 220 (or independent processor of interfaces 210) to perform functions relating to the techniques described herein. For example, the techniques herein may be treated as extensions and/or alternatives to conventional protocols, such as various encapsulation and/or forwarding protocols (e.g., MPLS) or more specifically, entropy label protocols, and as such, may be processed by similar components understood in the art that execute those protocols, accordingly.

Operationally, the techniques herein are generally premised on allowing the ingress PE router send a multipath information query (e.g., a bit-masked-label or entropy information multipath query) towards each ePE router, and to use the result to build a local table that can help load share the traffic. Specifically, for the techniques herein, during any path failure, the ingress PE router eliminates that particular path (e.g., LSP) from the load-sharing calculation, avoiding use of the failed path (e.g., broken LSP).

Figure 4A:
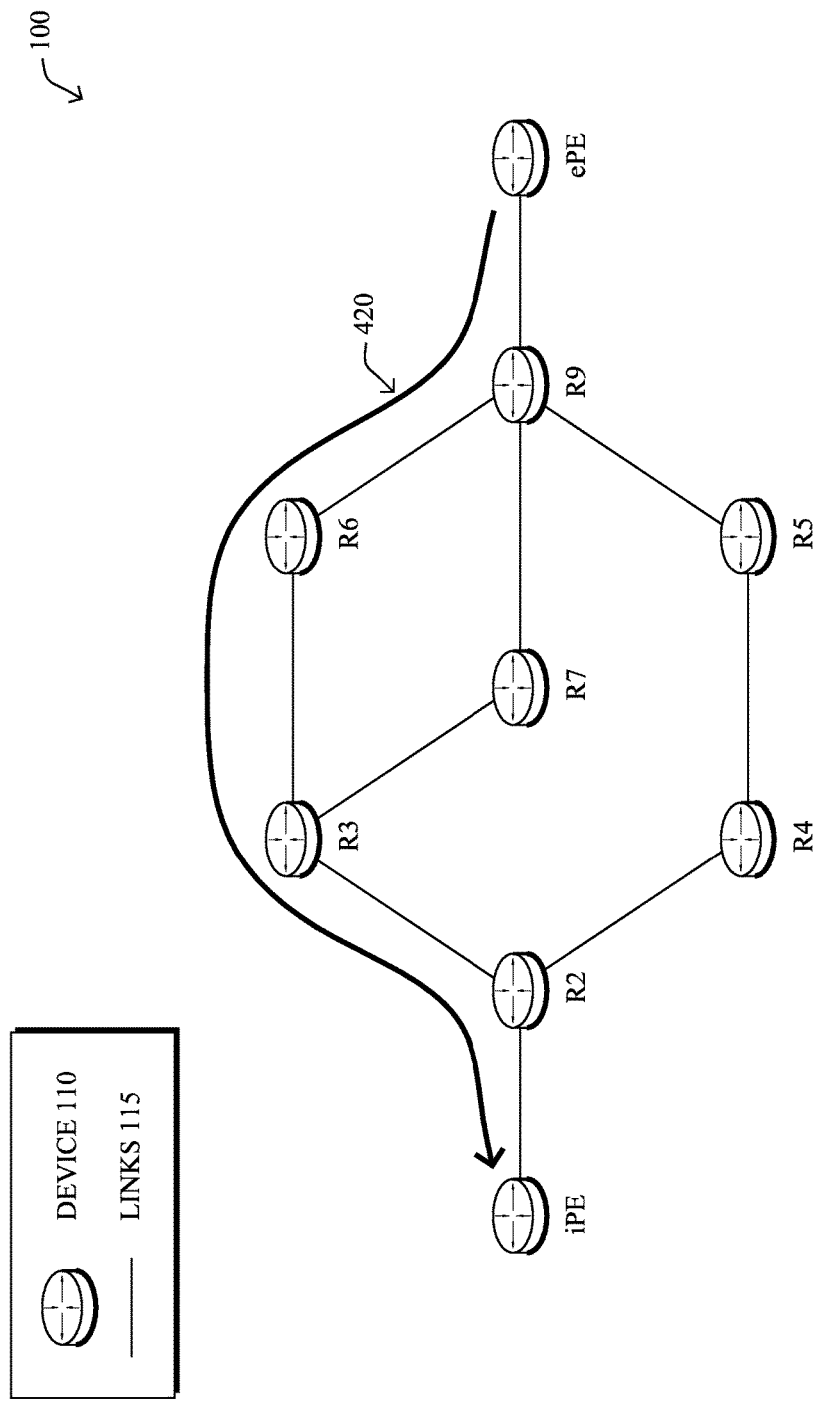
FIGS. 4A-4C illustrate an example of prefix advertisement and multipath tracing.

First, with reference to FIG. 4A, any edge router (e.g., egress router, ePE) advertising a prefix to other edge routers (e.g., ingress routers, iPE) includes within the advertisement 420 the below additional information (e.g., in a newly defined BGP Attribute):

1. Supported encapsulation protocol(s) (e.g., GRE, IP-in-IP, GRE, UDP, MPLS, etc.); and
2. Order of preference for the encapsulation protocols (e.g. MPLS, then UDP, then GRE, then IP-in-IP, etc.).

Figure 4B:
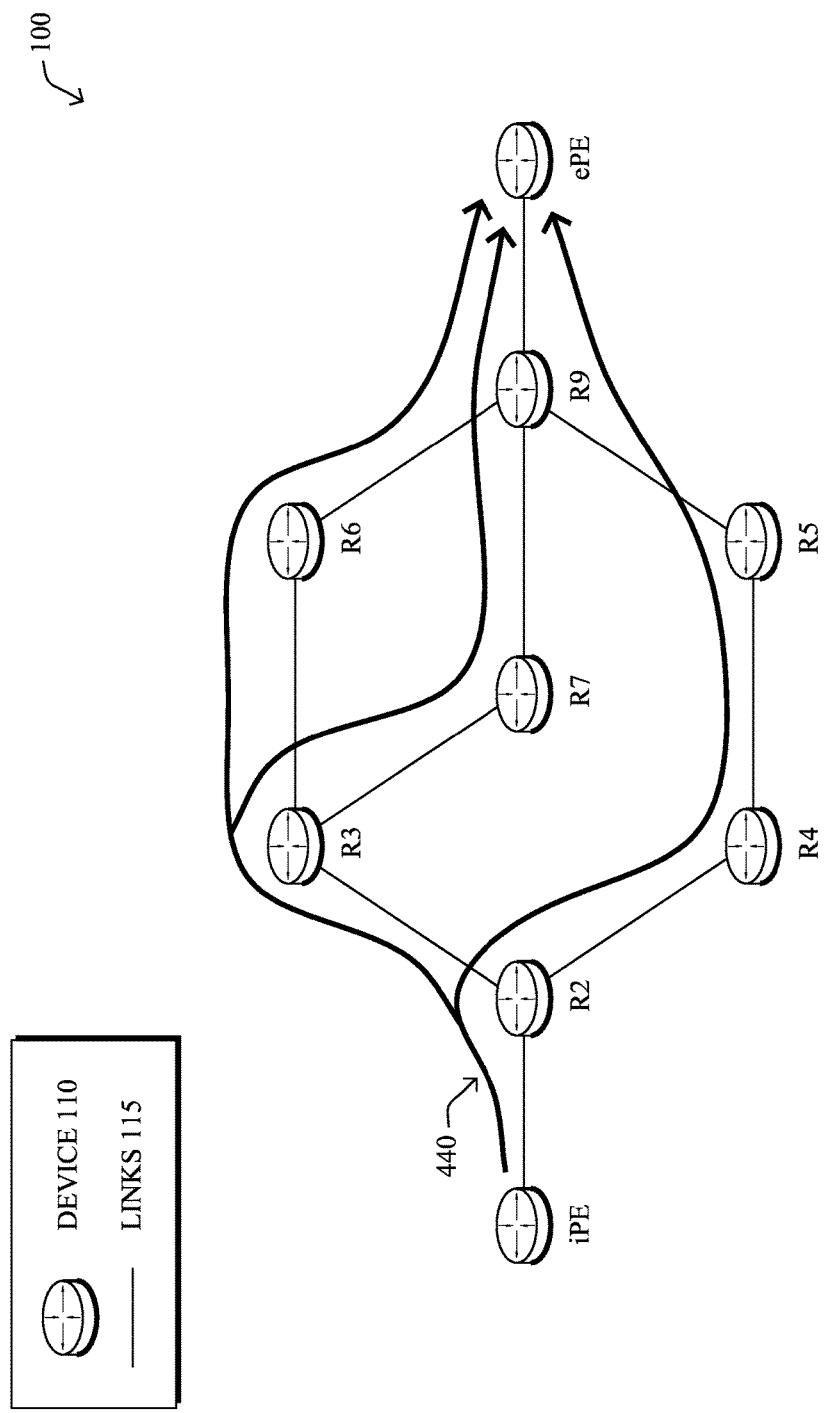

The receiving ingress router(s) (e.g., iPE) would then choose the encapsulation protocol to be used for forwarding traffic based on the received list (e.g., and preference). According to the techniques herein, and with reference to FIG. 4B, the ingress router sends a multipath information query 440 toward the egress router to determine the multiple paths and associated entropy information. For example, iPE may send a bit-masked-label multipath information query (such as in accordance with the Internet Engineering Task Force's Request for Comment (RFC) 4379, "RFC4379") towards ePE to determine the entropy (label) associated with each path.

As an example, assume that an entropy label set is determined by an LSP tree trace mechanism (e.g., as defined in RFC4379) when iPE initially performs an ECMP tree trace to ePE and learns about the three possible paths along with the label ranges per path. For example:

R2 returns a label range of 10-100 for R3 as downstream and 101-200 for R4 as downstream;
R3, on getting the request from iPE (with label range as 10-100), returns a label range of 10-50 for R6 and 51-100 for R7; and
R4, R6 and R7 would return the same label range as they received from their respective downstream node.

The ingress router (e.g., iPE) would then select one entropy label within the range per path (per ePE) to use for the encapsulation. That is, sources wishing to add flow entropy may then choose a label from the set advertised by the devices along a particular path (or otherwise configured) and may add that label to the forwarding-relevant fields in the packets 140. Note that alternatively, in one or more embodiments, entropy labels may be based on management/administrator configuration, configuration via a software defined network (SDN) type of operation (e.g., a path computation element or "PCE"), or via targeted label distribution protocol (LDP) configuration, or some other flow between a sender and receiver such as an operations, administration, and management (OAM) flow. Notably, the entropy labels may be a range of labels, a set of ranges, an explicit list of individual labels, and so on.

Figure 4C:
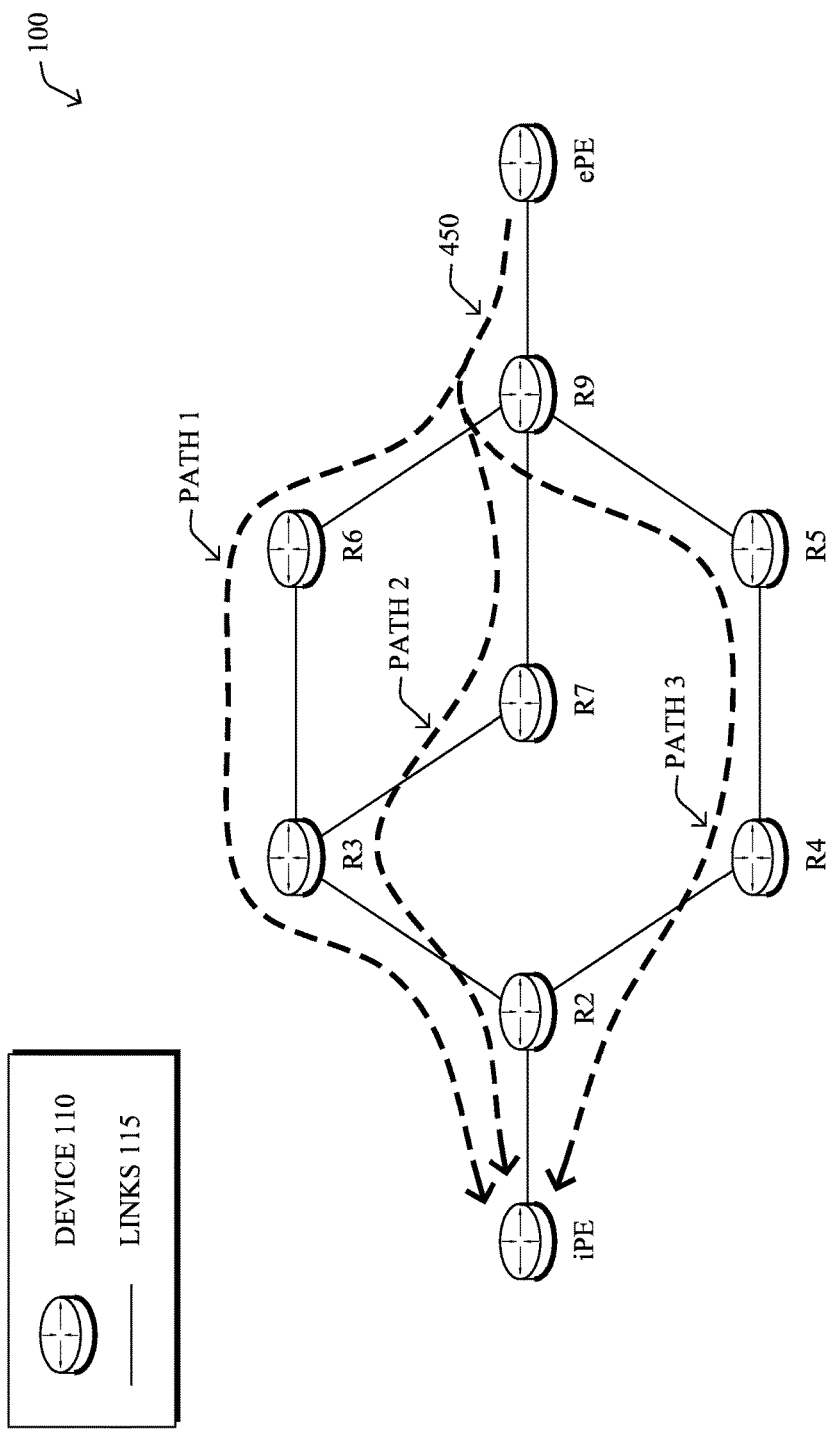

Based on the returned responses 450 to this query as shown in FIG. 4C, the ingress router may then build (create or update) a local entropy table 500 (e.g., a data structure 245), such as shown in FIG. 5. (Note that the actual structure and format of the table 500 may be different, and table 500 is merely one example for reference.) As shown, each remote PE 510 is mapped to a list of available paths 520, and associated entropy information 530 (e.g., label) for each path. The entropy information 530 may be populated with a range of labels returned by each hop discovered during the ECMP tree trace. For example, in the reference topology, iPE will have three ECMP paths to ePE as shown in the table 500, such as:

PATH1→iPE R2 R3 R6 R9 ePE;
PATH2→iPE R2 R3 R7 R9 ePE; and
PATH3→iPE R2 R4 R5 R9 ePE.

Hence, iPE uses the range 530 (e.g., "EL1", etc.) per path 520 per egress router 510 as the entropy label set and populates the entropy table accordingly for use during the packet forwarding.

Note that while the above description generally references entropy label queries (which is for label based encapsulation), different multipath information queries can be used to populate the entropy information field 530. For instance, multipath information may generally depend upon the encapsulation protocol and available sources of entropy for ECMP. For example, in addition to using bit-masked multipath labels or ranges (e.g., an IPv6 Flow Label), bit-masked GRE keys or bit-masked source UDP ports may also be used as multipath types for other ECMP treetraces.

Figure 6:
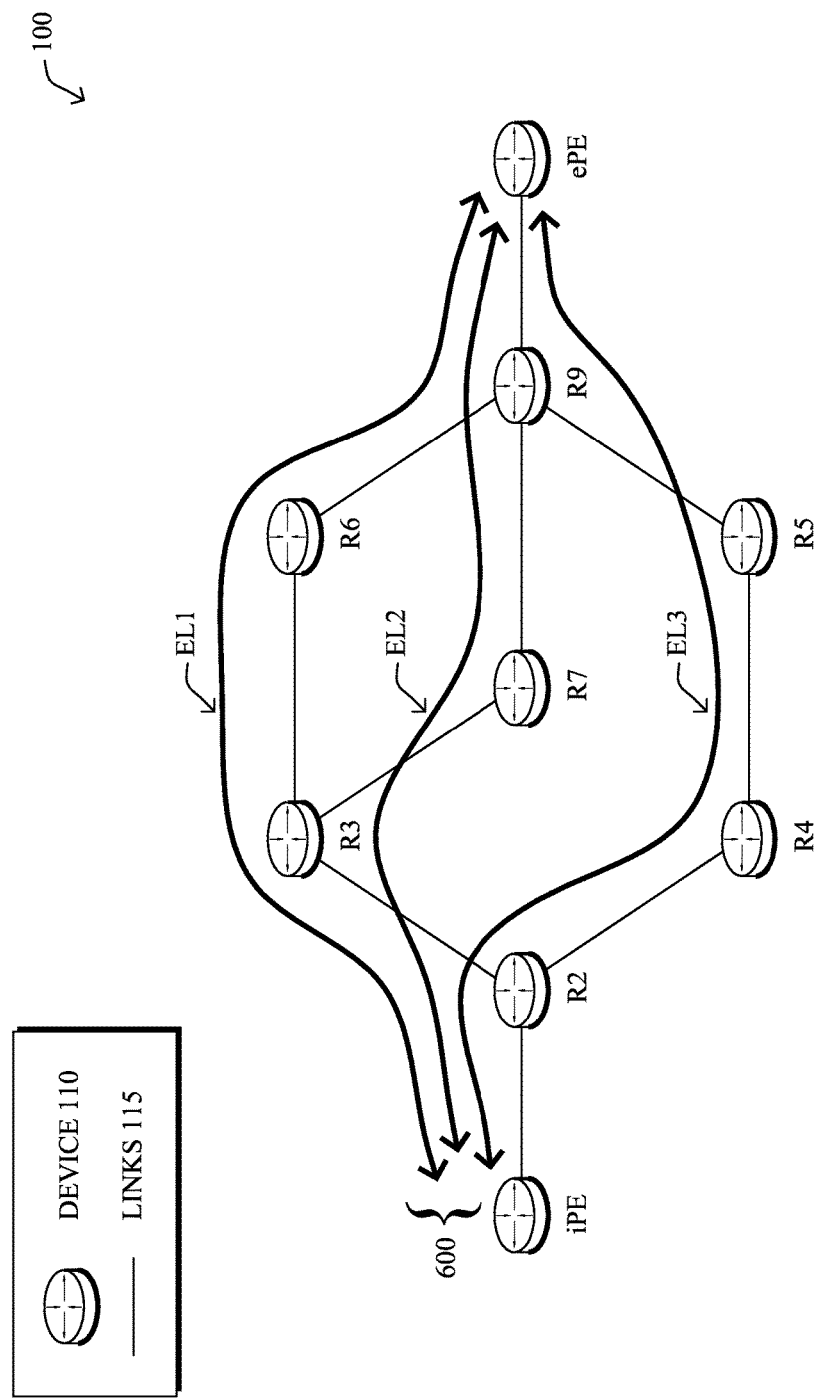
FIG. 6 illustrates an example connectivity verification protocol operation.

Once the table entry is created, the ingress router (e.g., iPE) monitors the health of each path towards the egress routers (e.g., toward ePE) by executing a connectivity verification protocol with the egress router(s), such as bi-directional forwarding detection (BFD) session. Illustratively, each session (e.g., BGP session) may use different entropy labels (e.g., EL1 for a first session on a first path, EL2 for a second session, and EL3 for a third session) so that each session will traverse over a different path. An example connectivity verification protocol session 600 is shown in FIG. 6.

Figure 7A:
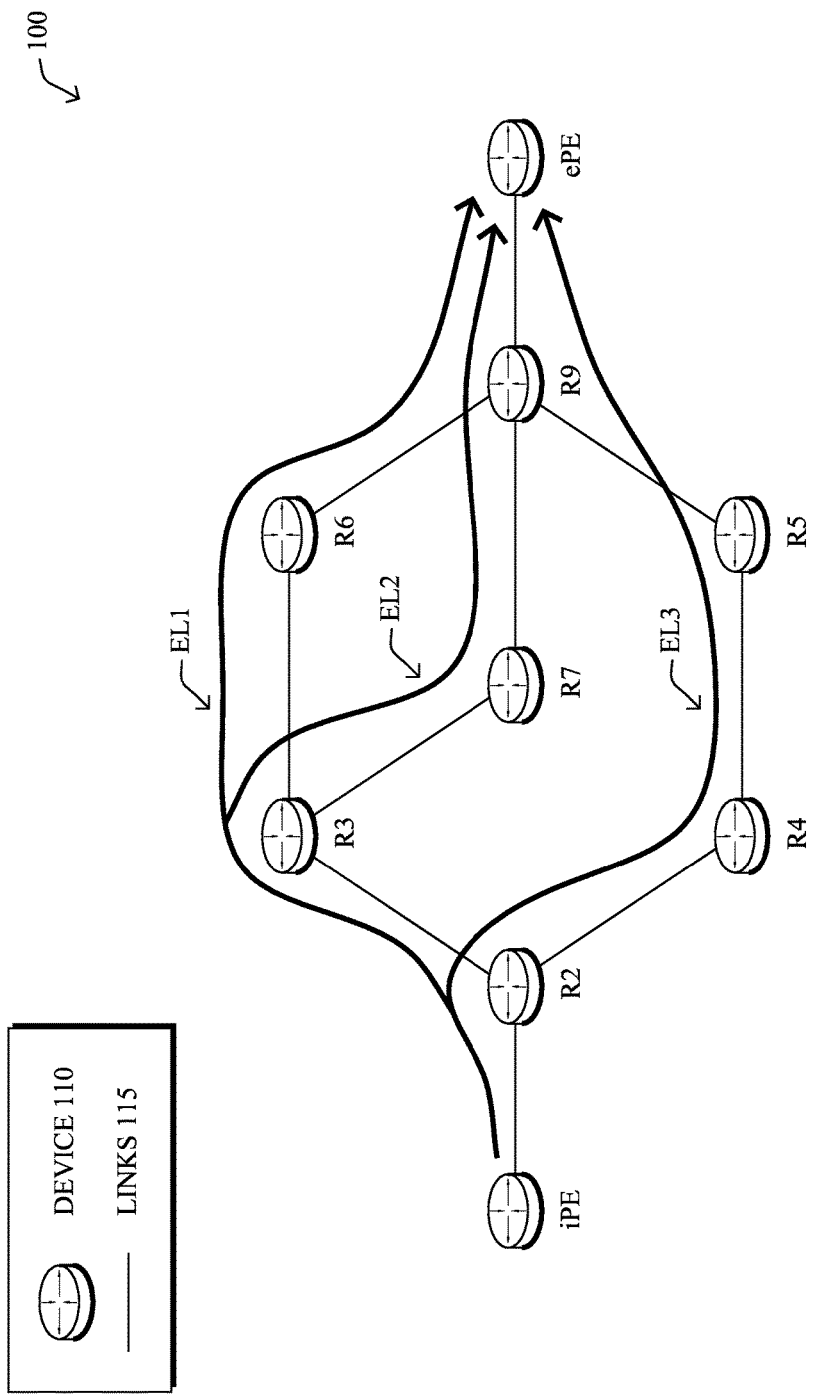
FIGS. 7A-7C illustrate an example of reliable multipath forwarding.

Under normal conditions, i.e., without a failure as shown in FIG. 7A, when any ingress traffic is received at the ingress router (e.g., from a VPN customer, customer edge device, etc.), the ingress router (e.g., iPE) determines the appropriate egress router (e.g., ePE) and uses the preference to decide the encapsulation header, and further uses a hashing algorithm with table 500 to select a given path 520 from the list of paths and the associated entropy information 530 to populate the traffic's header for transmission toward the destination.

Figure 7B:
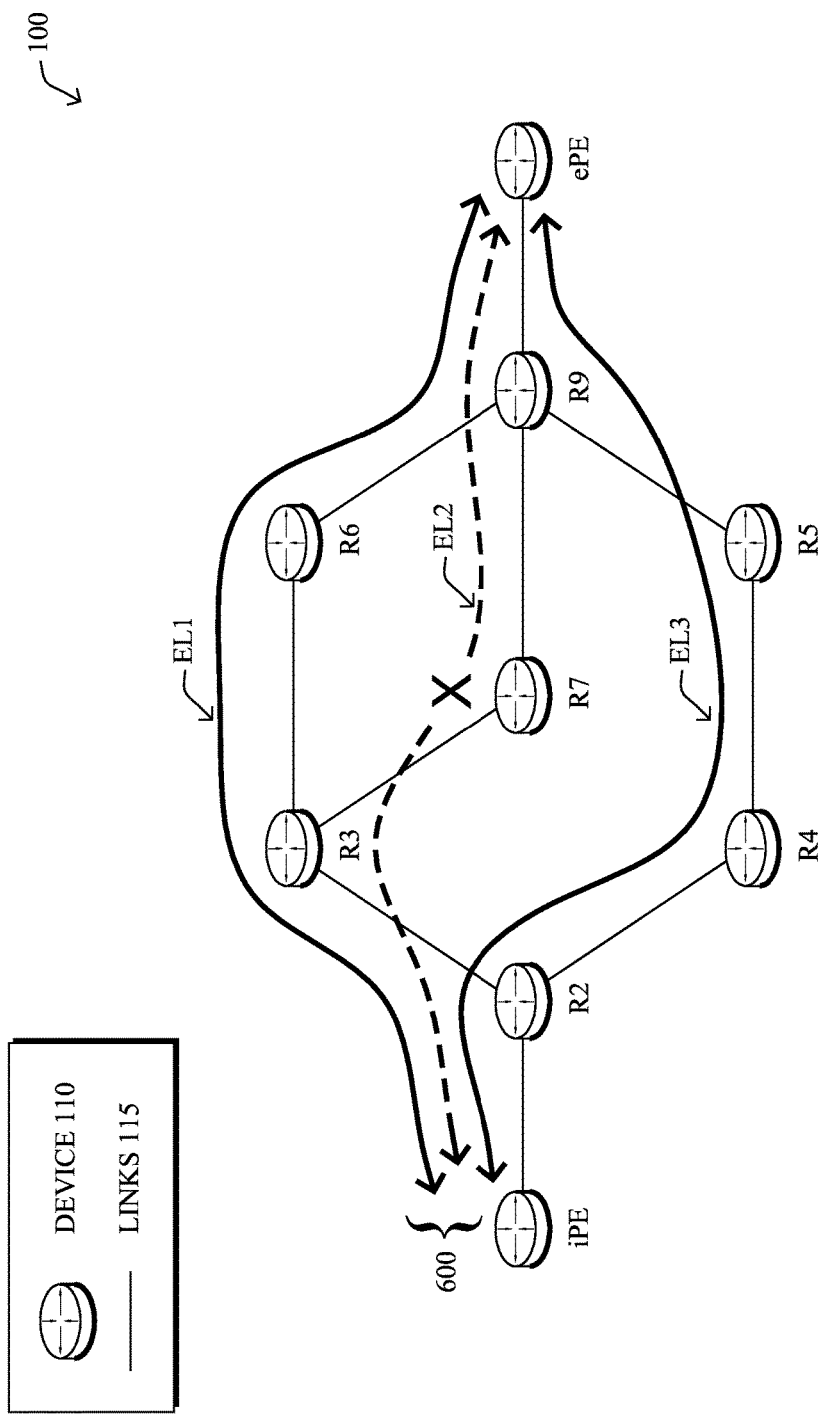
Figure 7C:
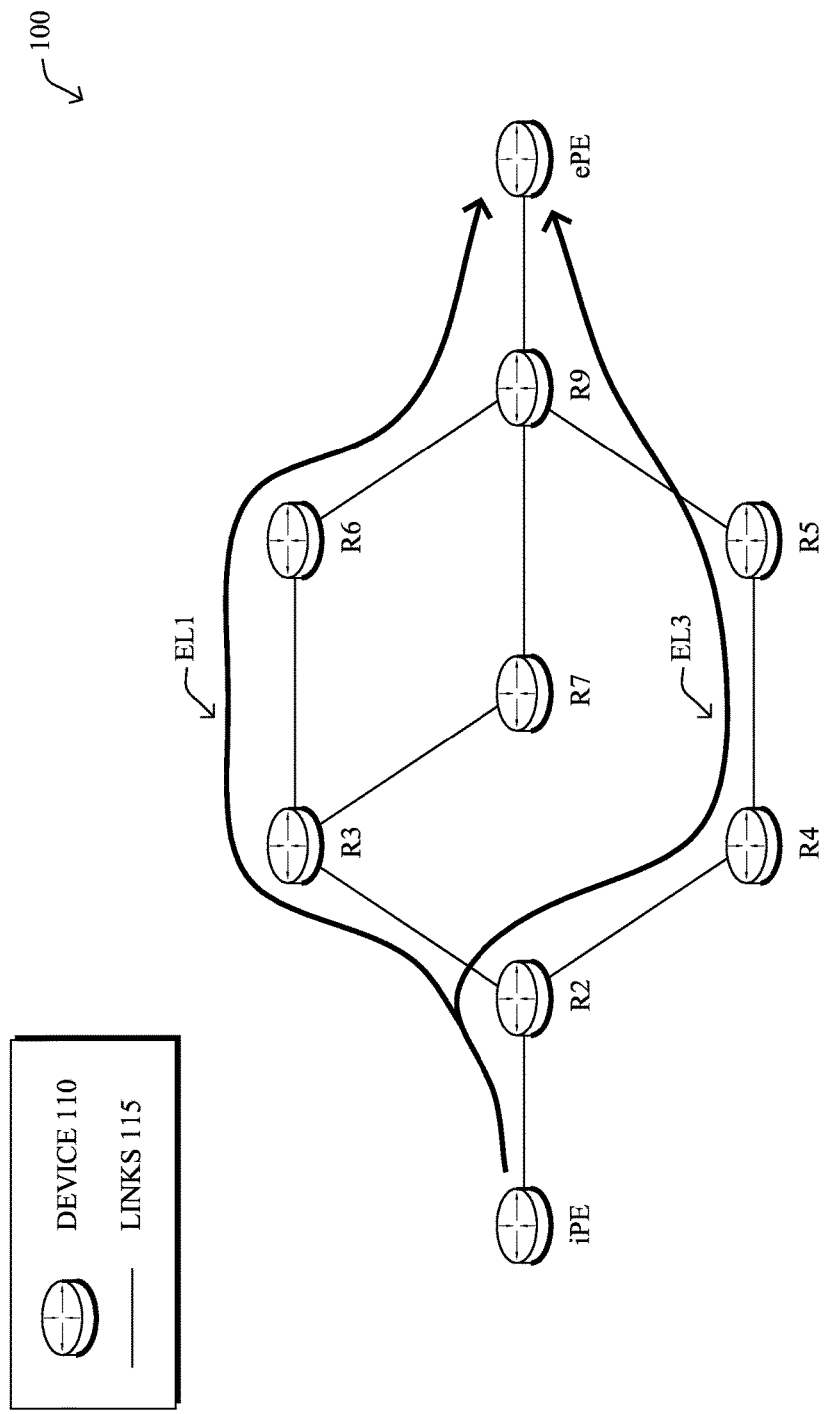

During failure condition, such as detected as shown in FIG. 7B by the connectivity verification protocol 600 (e.g., when one of the BFD sessions to ePE fails), the respective entry for that path in the table 500 will be disabled, and the ingress router will no longer use any of those entropy labels in traffic headers (packets 140). That is, the ingress router will run the same hashing logic as before, but the failed path's entropy label is removed (or otherwise disabled) from the list, and thus the ingress router will choose a path from the remaining (functional) available paths. Accordingly, this prevents any intermediate transit nodes from using the failed path, as shown in FIG. 7C.

Note that if the only (remaining or ever existing) path between iPE and ePE fails (that is, there is no ECMP existing, and the path fails), the ingress router can then choose the next preferred encapsulation mode supported by the egress router, and transmits the traffic with the subsequent encapsulation protocol. Note also that the techniques herein can also use different OAM sessions to validate each encapsulation path, for example, one for LSP validation and another for normal IP validation, and so on.

In accordance with one or more specific embodiments herein, various measures may be taken to provide scalability. For instance, in some networks, there may exist many ECMP paths between PEs as well as a large number of PEs. Complete coverage of ECMP paths, therefore, would require a large number of ECMP paths and associated connectivity verification protocol sessions. As a way of reducing the number of sessions between two PEs with many ECMPs, a single session can be used to monitor a number of ECMP paths. For instance, using the example of iPE and ePE and the three ECMP paths above, this could be performed as follows (using BFD as an example):

iPE sends BFD packets with EL1 for a period long enough detect and report a failure on PATH1. iPE then sends BFD packets with EL2 for the same length period. It continues this cycling through all three EL labels.
 If a failure is detected on say EL2, the above procedures are used to cease using PATH2. iPE may then attempt to establish two BFD sessions with EL2 and EL3. If EL3 succeeds and EL2 fails, then iPE proceeds as above, but cycling through EL3 and EL1. In the less likely case that EL3 fails and EL2 succeeds, PATH2 is returned to service and PATH3 is removed. If both fail PATH3 is removed from service. If both sessions succeed, a number of actions can be taken based on policy, e.g. PATH2 is returned to service and a transient failure is logged and/or reported.

Notably, the techniques herein can react in a scalable way to routing changes, such as where any routing change due to link down/up event causes the transit node to quickly redirect the (impacted) traffic over the functional link(s)/paths (i.e., a resulting egress link after entropy hashing), and without manual intervention. Additionally, the techniques herein also help to reduce the traffic outage/black-holing when a link is UP, but packets still get dropped, such as due to these example reasons:
 MPLS forwarding label corruption;
 Line Card ASIC forwarding malfunction;
 Intermittent L2 provider failure;
 Etc.

For instance, regarding link failure, such as if the R2-R4 link failed, R2 may utilize LFA-FRR and send corresponding traffic to remaining functional link/paths (e.g., to R3 in the example topology), thereby requiring no forwarding/entropy label changes from iPE's stand point. So iPE can either trigger a trace immediately on a IGP topology change to repopulate the table 500, or else with a delay to avoid multiple re-iterations. R3 receiving traffic with an entropy label outside the range of which it replied to iPE during tree trace is an expected behavior with entropy label usage (because the entropy label is informative). This will occur until the ECMP tree trace is run again. Also, if link R4-R5 fails and if there is no (r)LFA, then iPE would detect the failure of path PATH3 because the corresponding BFD session over PATH3 would fail. This would enable iPE to immediately removing PATH3 from forwarding (by disabling the corresponding Entropy Label) and using the other pre-established path(s). On the other hand, regarding link addition, if a link is added, iPE can run the ECMP tree trace again (e.g., periodically or else based on a trigger provided by IGP topology changes) and re-populates the entropy table, accordingly.

Figure 8:
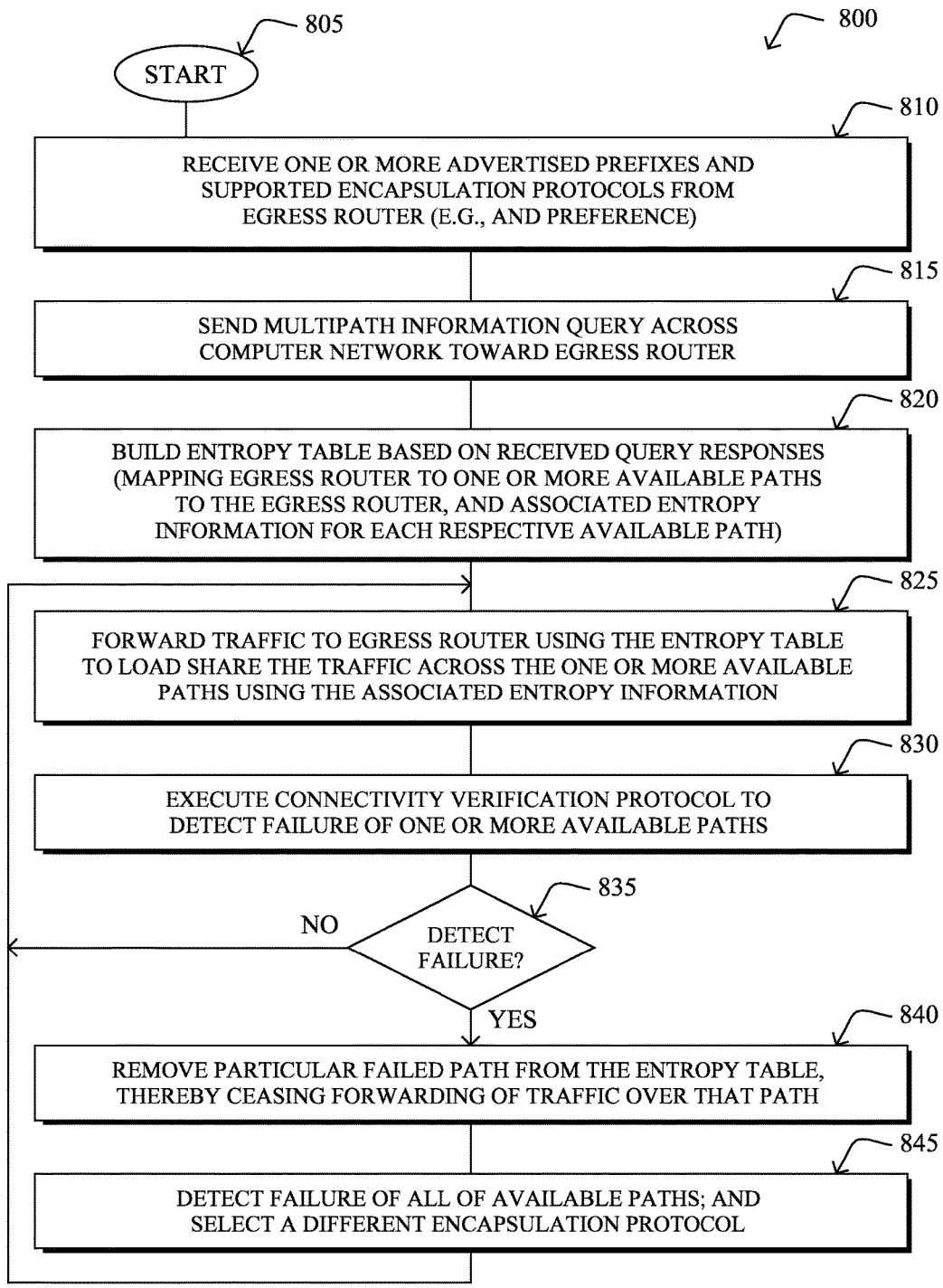
FIG. 8 illustrates an example simplified procedure for reliable multipath forwarding.

FIG. 8 illustrates an example simplified procedure 800 for reliable multipath forwarding for encapsulation protocols in computer networks in accordance with one or more embodiments described herein, particularly from the perspective of the ingress router (e.g., iPE). The procedure 800 may start at step 805, and continues to step 810, where, as described in greater detail above, the ingress router receives one or more advertised prefixes and supported encapsulation protocols from the egress router (e.g., in advertisement 420). As mentioned above, the ingress router chooses an encapsulation protocol for forwarding the traffic based on the supported encapsulation protocols for the egress router, and where the supported encapsulation protocols are received with an associated order of preference, chooses the encapsulation protocol for forwarding the traffic based also on the order of preference.

Once the ingress router learns of a prefix at an egress router, in step 815 it sends a multipath information query 440 across a computer network toward the egress router, and in step 820 builds an entropy table 500 based on received query responses as described above. For instance, the entropy table 500 maps the egress router 510 to one or more available paths 520 to the egress router, and associated entropy information 530 for each respective available path of the one or more available paths.

Once established, the ingress router may then begin forwarding traffic to the egress router in step 825 using the entropy table to load share the traffic across the one or more available paths using the associated entropy information for each respective available path. For example, as noted above, the ingress router can use a hashing algorithm on at least the entropy information within the traffic to perform the load sharing.

In step 830, in addition to forwarding the traffic, the ingress router also executes a connectivity verification protocol (e.g., BFD) to detect failure of any particular path of the one or more available paths (e.g., using the associated entropy information for each respective available path). Also, as noted above, in one embodiment a respective connectivity verification protocol session may be executed for each available path of the one or more available paths, while in another embodiment, the ingress router executes a shared connectivity verification protocol session shared by each available path of the one or more available paths, such that the shared connectivity verification protocol session cycles through the one or more available paths.

If there is a failure of a particular path of the one or more available paths in step 835, then in step 840 the ingress router removes the particular path from the entropy table as described above, thereby ceasing forwarding of traffic over the particular path. In the event, also, that this detected failure is for all of the one or more available paths (e.g., a last or only available path) using a first encapsulation protocol (e.g., MPLS) of the supported encapsulation protocols, the ingress router may select a second encapsulation protocol (e.g., GRE) of the supported encapsulation protocols for forwarding the traffic in step 845. Note that when a plurality of supported encapsulation protocols exist at the egress router, the connectivity verification protocol of step 830 can execute on at least a current encapsulation protocol (e.g., MPLS) of the supported encapsulation protocols and a subsequent encapsulation protocol (e.g., GRE) of the supported encapsulation protocols.

The procedure 800 may return to any of the steps described above, such as receiving new prefixes from egress routers, sending new multipath information queries across the computer network toward previously known egress routers to receive new query responses associated with one or more newly available paths (e.g., to find out if new paths exist), forwarding more traffic, executing the connectivity verification protocol(s), etc.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Notably, as an alternative embodiment contemplated herein, the use of entropy information forwarding can be imposed only when there is a failure in one of the available paths. For example, under normal conditions, the ingress router is not required to use entropy-based load sharing, and leave the load balancing decisions to the intermediate nodes. However, in this alternative embodiment, when there is a failure detected, the ingress router may immediately start pushing entropy information 530 from the table 500 after excluding the entry for the failed path.

The techniques described herein, therefore, provide for reliable multipath forwarding for encapsulation protocols in computer networks. In particular, the techniques herein provide a straightforward procedure to ensure the proper encapsulation and path are used in a dynamic way. Moreover, the dynamic traffic protection presented herein, particularly in case of intermittent path failure, ensures enhanced high availability with minimal changes to current protocols.

While there have been shown and described illustrative embodiments that provide for reliable multipath forwarding for encapsulation protocols in computer networks, it is to be understood that various other adaptations and modifications may be made within the spirit and scope of the embodiments herein. For example, the embodiments have been shown and described herein with relation to particular network orientations (e.g., provider networks) and protocols (e.g., MPLS). However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    sending, from an ingress router, a multipath information query across a computer network toward an egress router, wherein the query traverses multiple paths until the query is received by the egress router and the query identifies ranges for each path between the ingress router and egress router as an entropy label set;
    building, by the ingress router, an entropy table based on the entropy label set for each path between the ingress router and egress router, the entropy table mapping the egress router to one or more available paths to the egress router, and associated entropy information for each respective available path of the one or more available paths;
    forwarding traffic from the ingress router to the egress router using the entropy table to load share the traffic across the one or more available paths using the associated entropy information for each respective available path; and
    in response to detecting a failure of a particular path of the one or more available paths, removing the particular path from the entropy table, thereby ceasing forwarding of traffic over the particular path.

2. The method as in claim 1, further comprising:
    receiving, from the egress router, one or more advertised prefixes and supported encapsulation protocols; and
    choosing an encapsulation protocol for forwarding the traffic based on the supported encapsulation protocols for the egress router.

3. The method as in claim 2, wherein the supported encapsulation protocols are received from the egress router with an associated order of preference, and wherein choosing the encapsulation protocol for forwarding the traffic is further based on the order of preference.

4. The method as in claim 2, further comprising:
    detecting a failure of all of the one or more available paths using a first encapsulation protocol of the supported encapsulation protocols; and, in response,
    selecting a second encapsulation protocol of the supported encapsulation protocols for forwarding the traffic.

5. The method as in claim 1, further comprising:
    detecting the failure based on a connectivity verification protocol on each of the one or more available paths using the associated entropy information for each respective available path.

6. The method as in claim 5, wherein a plurality of supported encapsulation protocols exist at the egress router, the method further comprising:
    executing the connectivity verification protocol on at least a current encapsulation protocol of the supported encapsulation protocols and a subsequent encapsulation protocol of the supported encapsulation protocols.

7. The method as in claim 5, further comprising:
executing a respective connectivity verification protocol session for each available path of the one or more available paths.

8. The method as in claim 5, further comprising:
executing a shared connectivity verification protocol session shared by each available path of the one or more available paths, wherein the shared connectivity verification protocol session cycles through the one or more available paths.

9. The method as in claim 1, wherein forwarding the traffic further comprises:
load sharing using a hashing algorithm on at least the entropy information within the traffic.

10. The method as in claim 1, further comprising:
sending a new multipath information query across the computer network toward the egress router to receive new query responses associated with one or more newly available paths.

11. The method as in claim 1, wherein forwarding traffic from the ingress router to the egress router using the entropy table to load share the traffic across the one or more available paths using the associated entropy information for each respective available path occurs in response to detecting the failure of the particular path.

12. An apparatus, comprising:
one or more network interfaces to communicate on links within a computer network as an ingress router;
a processor coupled to the network interfaces and configured to execute one or more processes; and
a memory configured to store a process executable by the processor, the process when executed operable to:
send a multipath information query across the computer network toward an egress router, wherein the query traverses multiple paths until the query is received by the egress router and the query identifies ranges for each path between the ingress router and egress router as an entropy label set;
build an entropy table based on the entropy label set for each path between the ingress router and egress router, the entropy table mapping the egress router to one or more available paths to the egress router, and associated entropy information for each respective available path of the one or more available paths;
forward traffic to the egress router using the entropy table to load share the traffic across the one or more available paths using the associated entropy information for each respective available path; and
in response to detecting a failure of a particular path of the one or more available paths, remove the particular path from the entropy table, thereby ceasing forwarding of traffic over the particular path.

13. The apparatus as in claim 12, wherein the process when executed is further operable to:
receive, from the egress router, one or more advertised prefixes and supported encapsulation protocols; and
choose an encapsulation protocol for forwarding the traffic based on the supported encapsulation protocols for the egress router.

14. The apparatus as in claim 13, wherein the supported encapsulation protocols are received from the egress router with an associated order of preference, and wherein choosing the encapsulation protocol for forwarding the traffic is further based on the order of preference.

15. The apparatus as in claim 13, wherein the process when executed is further operable to:
detect a failure of all of the one or more available paths using a first encapsulation protocol of the supported encapsulation protocols; and, in response,
select a second encapsulation protocol of the supported encapsulation protocols for forwarding the traffic.

16. The apparatus as in claim 12, wherein the process when executed is further operable to:
detect the failure based on a connectivity verification protocol on each of the one or more available paths using the associated entropy information for each respective available path.

17. The apparatus as in claim 16, wherein a plurality of supported encapsulation protocols exist at the egress router, wherein the process when executed is further operable to:
execute the connectivity verification protocol on at least a current encapsulation protocol of the supported encapsulation protocols and a subsequent encapsulation protocol of the supported encapsulation protocols.

18. The apparatus as in claim 16, wherein the process when executed is further operable to:
execute a respective connectivity verification protocol session for each available path of the one or more available paths.

19. The apparatus as in claim 16, wherein the process when executed is further operable to:
execute a shared connectivity verification protocol session shared by each available path of the one or more available paths, wherein the shared connectivity verification protocol session cycles through the one or more available paths.

20. The apparatus as in claim 12, wherein the process when executed to forward the traffic is further operable to:
load share using a hashing algorithm on at least the entropy information within the traffic.

21. A tangible, non-transitory, computer-readable media having software encoded thereon, the software, when executed by a processor on an ingress router, operable to:
send a multipath information query across the computer network toward an egress router, wherein the query traverses multiple paths until the query is received by the egress router and the query identifies ranges for each path between the ingress router and egress router as an entropy label set;
build an entropy table based on the entropy label set for each path between the ingress router and egress router, the entropy table mapping the egress router to one or more available paths to the egress router, and associated entropy information for each respective available path of the one or more available paths;
forward traffic to the egress router using the entropy table to load share the traffic across the one or more available paths using the associated entropy information for each respective available path; and
in response to detecting a failure of a particular path of the one or more available paths, remove the particular path from the entropy table, thereby ceasing forwarding of traffic over the particular path.

\* \* \* \* \*